Figure 5:
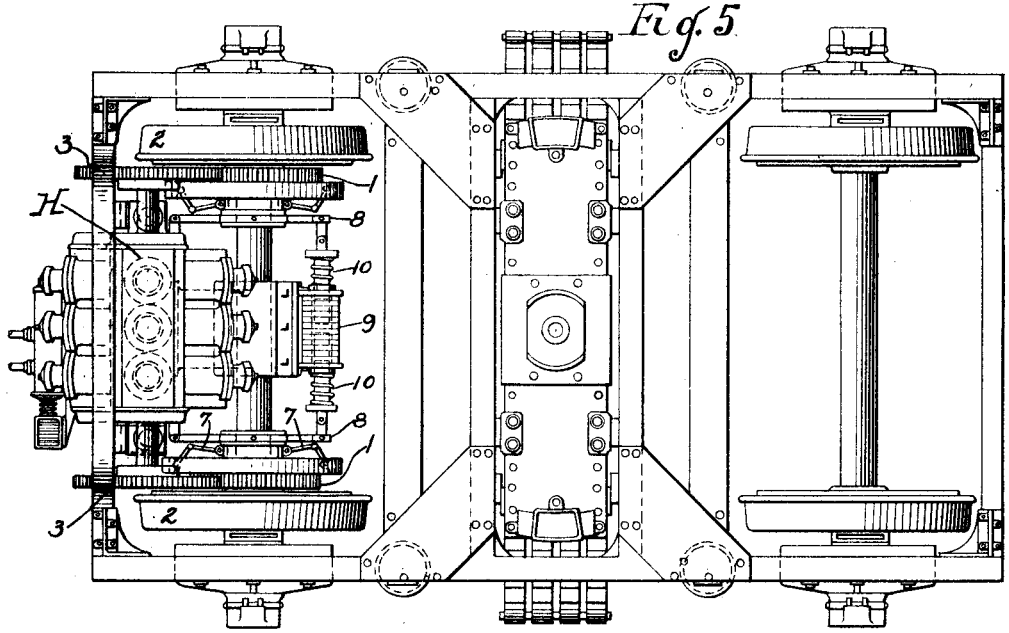

A. SUNDH.
TRAIN CONTROL SYSTEM.
APPLICATION FILED JULY 31, 1913.
1,185,954.
Patented June 6, 1916.
9 SHEETS—SHEET 1.
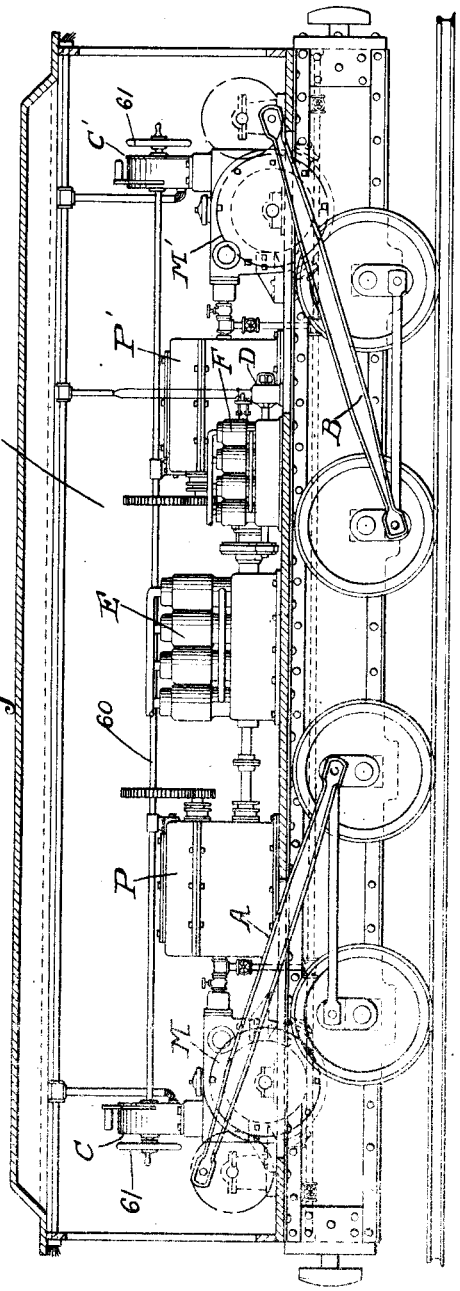
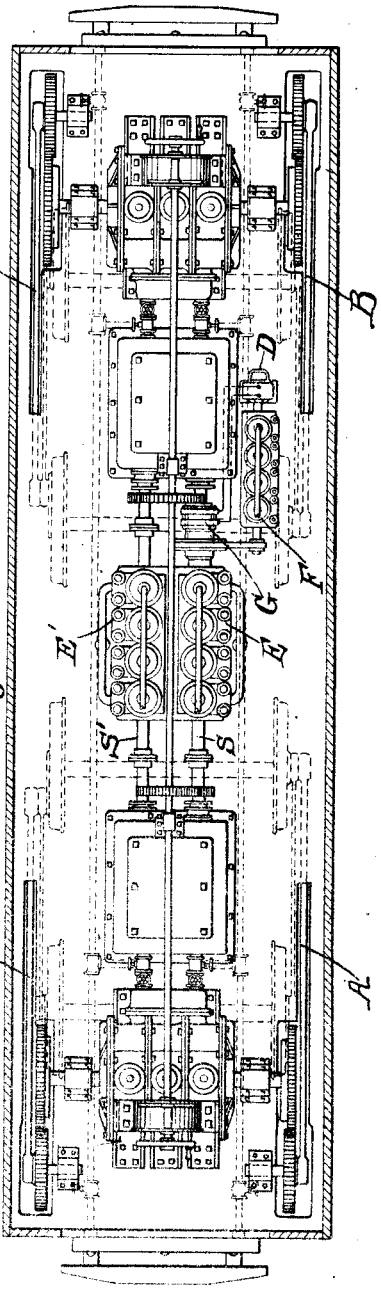

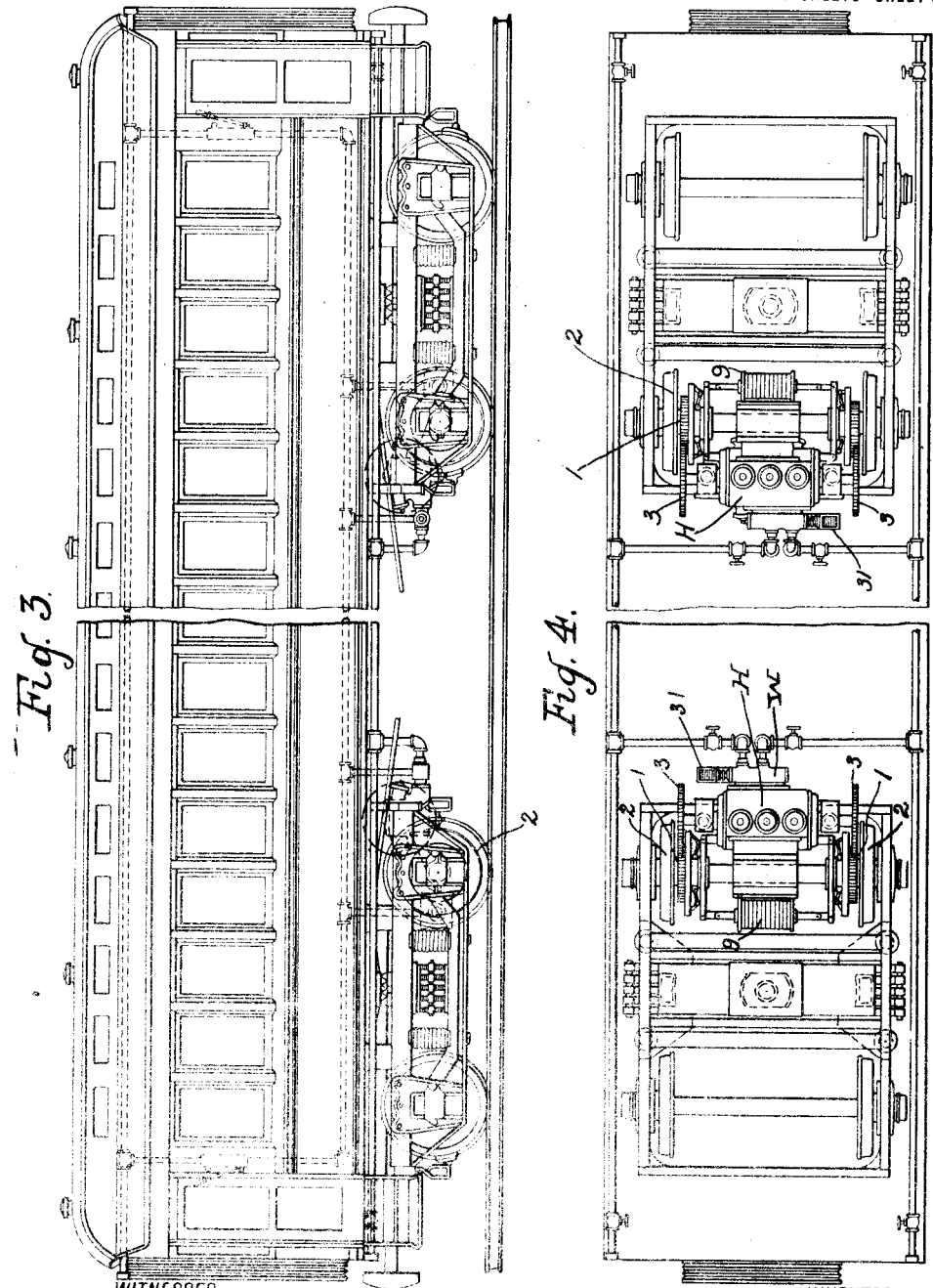

A. SUNDH.
TRAIN CONTROL SYSTEM.
APPLICATION FILED JULY 31, 1913.

1,185,954.

Patented June 6, 1916.
9 SHEETS—SHEET 3.

WITNESSES:
Arthur Trezise Jr.
James G. Bethell.

INVENTOR
August Sundh
BY
L. H. Campbell
ATTORNEY

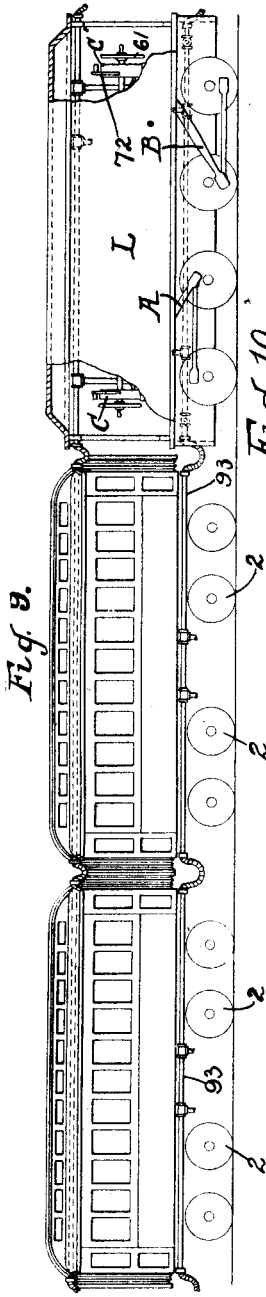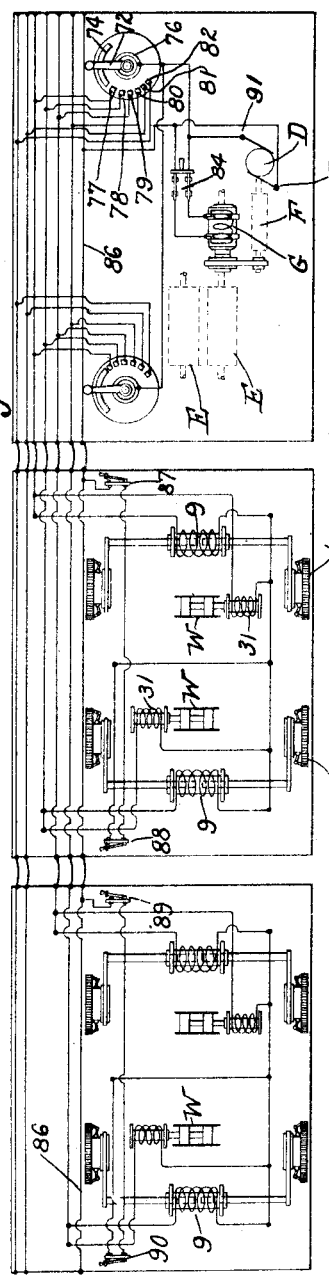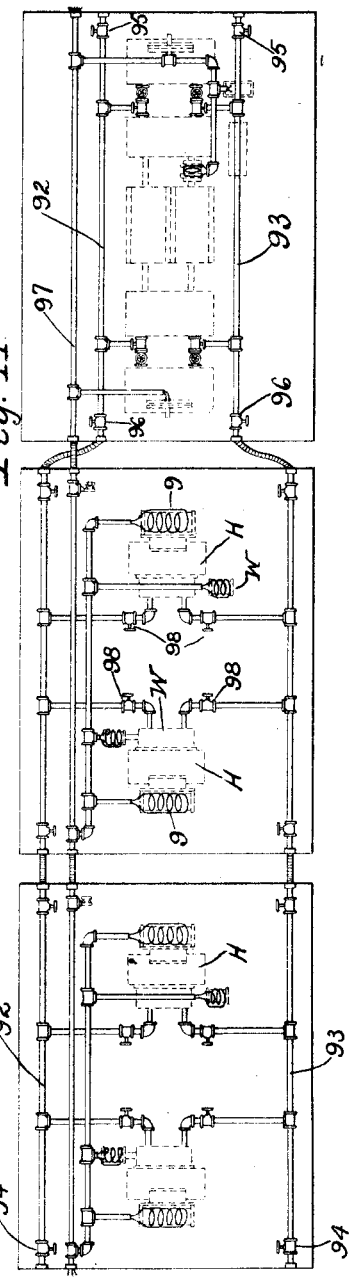

A. SUNDH.
TRAIN CONTROL SYSTEM.
APPLICATION FILED JULY 31, 1913.
1,185,954. Patented June 6, 1916.
9 SHEETS—SHEET 5.
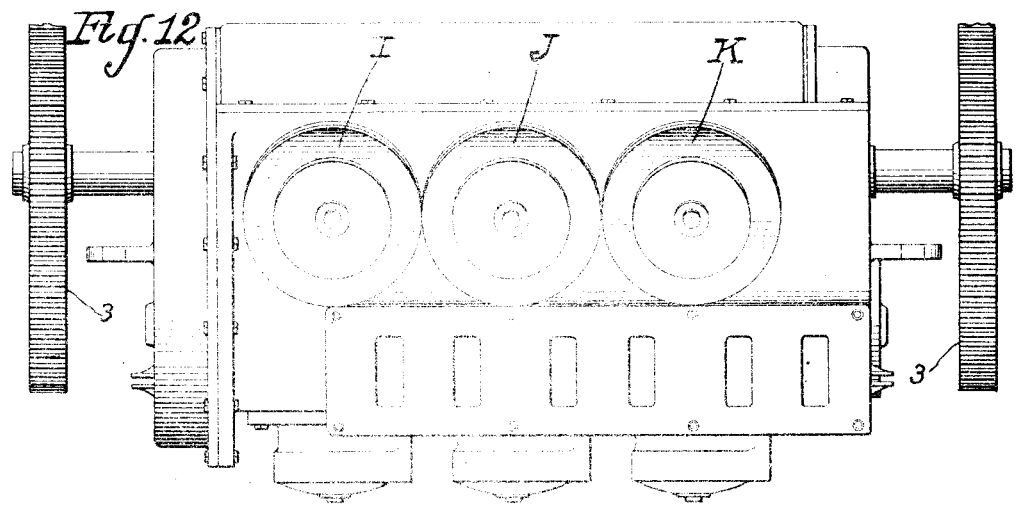
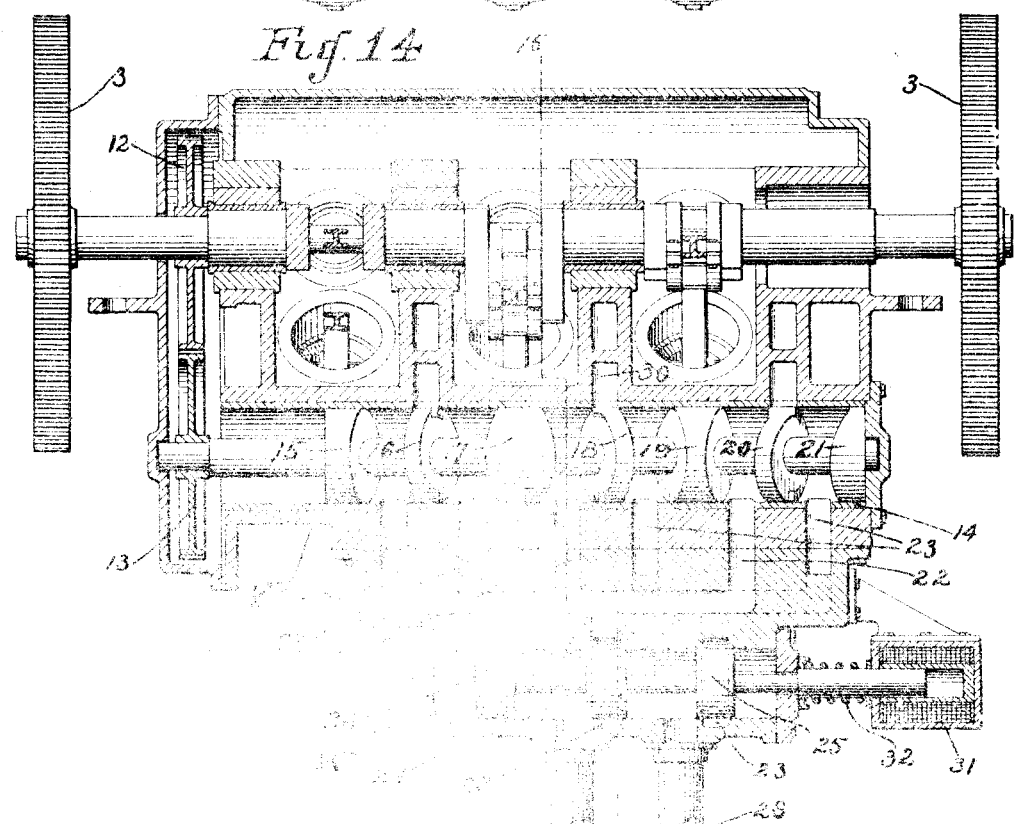

A. SUNDH.
TRAIN CONTROL SYSTEM.
APPLICATION FILED JULY 31, 1913.

1,185,954.

Patented June 6, 1916.
9 SHEETS—SHEET 7.

WITNESSES:
Arthur Trezise Jr.
James G. Bethell.

INVENTOR
August Sundh
BY
L. H. Campbell
ATTORNEY

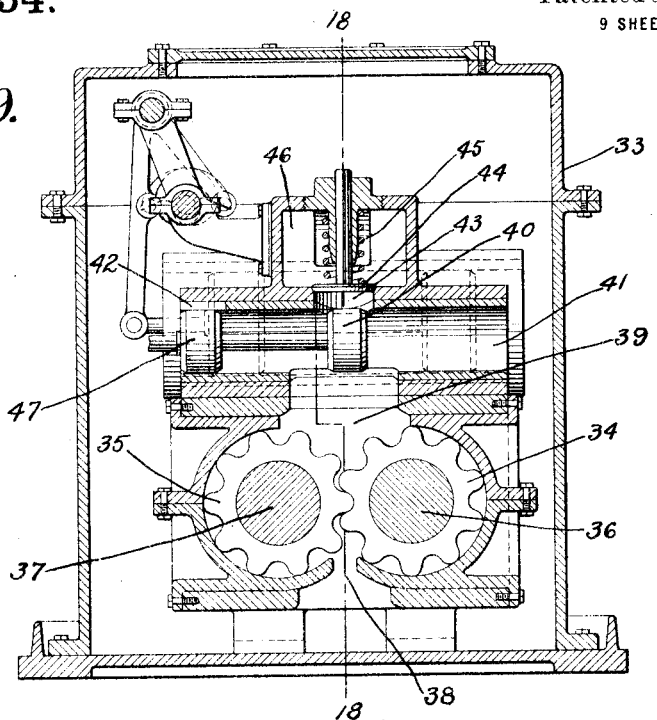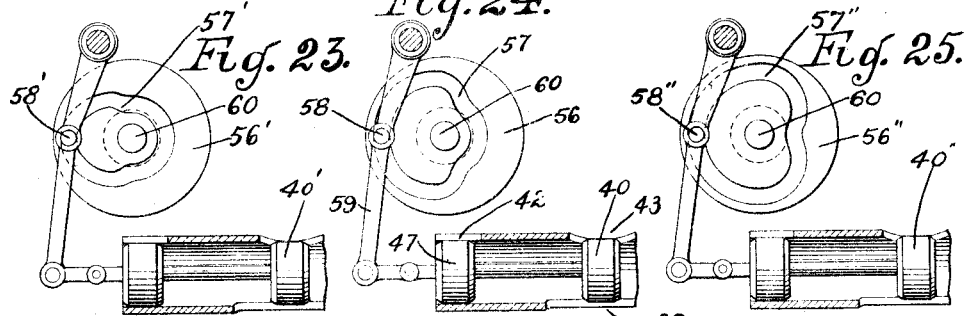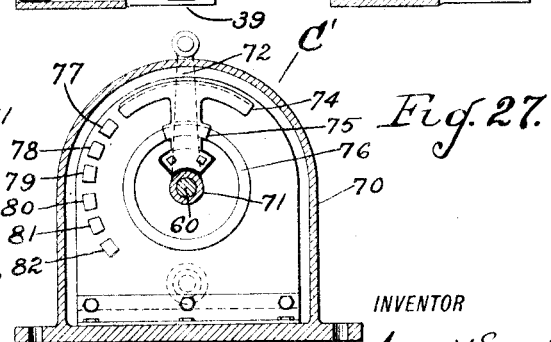

A. SUNDH.
TRAIN CONTROL SYSTEM.
APPLICATION FILED JULY 31, 1913.
1,185,954.
Patented June 6, 1916.
9 SHEETS—SHEET 9.
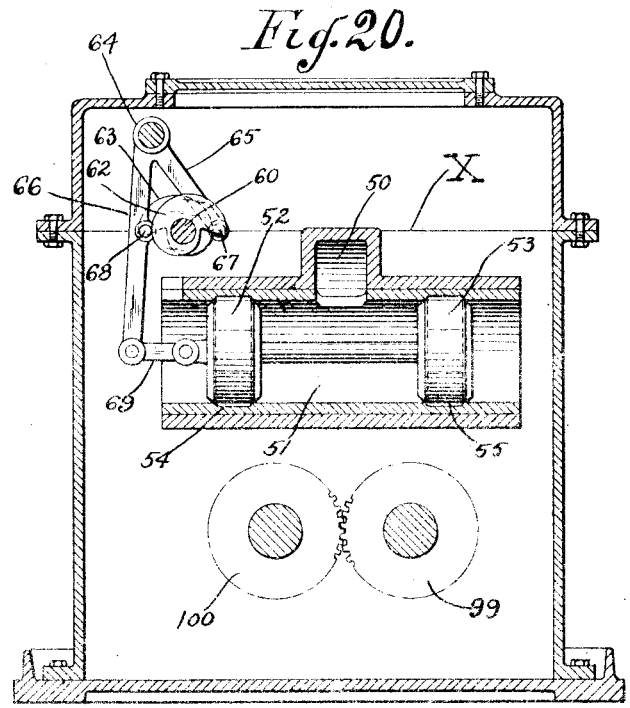
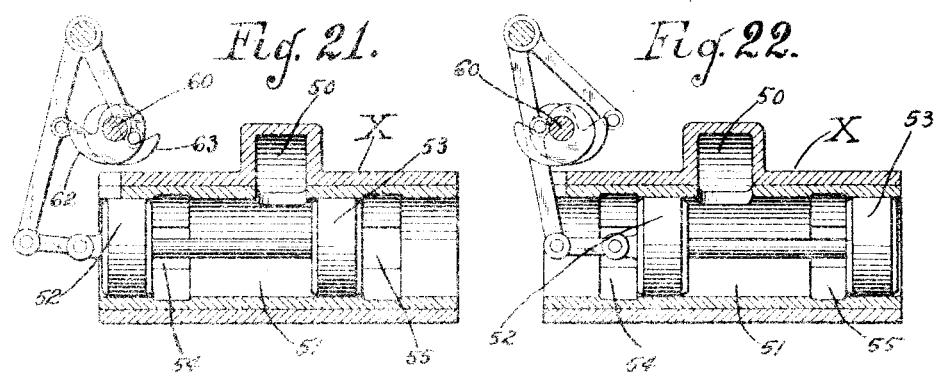
WITNESSES:
Arthur Trezise Jr
James G. Bethell.
INVENTOR
August Sundh
BY
L. H. Campbell
ATTORNEY

UNITED STATES PATENT OFFICE.

AUGUST SUNDH, OF HASTINGS-UPON-HUDSON, NEW YORK, ASSIGNOR TO OTIS ELEVATOR COMPANY, A CORPORATION OF NEW JERSEY.

TRAIN-CONTROL SYSTEM.

1,185,954.　　　　　Specification of Letters Patent.　　Patented June 6, 1916.

Application filed July 31, 1913. Serial No. 782,159.

*To all whom it may concern:*

Be it known that I, AUGUST SUNDH, a citizen of the United States, residing in Hastings-upon-Hudson, in the county of Westchester and State of New York, have invented a new and useful Improvement in Train-Control Systems, of which the following is a specification.

My invention relates to a system of operating a vehicle or a train of connected vehicles, such as railway cars, by means of fluid pressure generated upon and controlled from one of the said vehicles.

One object of the invention is the provision of means for applying a driving force to the several wheels of a train of connected cars through the intermediary of a fluid under pressure so as to obtain a maximum tractive effect and thereby enable the train quickly to accelerate or slow down and stop.

A further object of the invention is the provision of a system of control and operation of a train of connected cars, whereby the act of slowing down and stopping may be effected without the use of the customary friction brakes.

Other objects of the invention will appear hereinafter, the novel combinations of elements being pointed out in the appended claims.

In the present embodiment of my invention, I propose to equip one of the cars of a train, which I shall hereinafter refer to as the locomotive, with a prime mover, preferably in the form of a twin internal combustion engine, which is connected to drive a pump. Each car truck is provided with a fluid pressure motor arranged to be connected to, or disconnected from, the axle of the car truck, and the fluid motors of each car are connected in parallel with each other and to the pumps on the locomotive. The fluid motors are controlled from the locomotive by electro-responsive devices which are energized by current generated on the locomotive by an additional or auxiliary internal combustion engine, which latter is also used to start the main power engine. In starting the train, the fluid pressure motors are connected in parallel and operate with great power at slow speed. After the train is in motion, the fluid motors are successively disconnected from their respective car axles and the fluid cut off therefrom, thereby gradually reducing the working area of the fluid from the pumps until all of the car motors are idle and the fluid motors on the locomotive alone drive the train at maximum speed. In slowing down the motors are successively cut in thereby increasing the working area of the fluid attended by a reduction in the speed of the train, until finally all of the fluid motors are active and the train is moving very slowly. In stopping, the fluid supplied by the pumps on the locomotive is reduced and finally cut off from all of the motors and the latter act as brakes to stop the train, the main engine on the locomotive running idle.

The invention may best be understood by reference to the drawings, in which—

Figure 6:
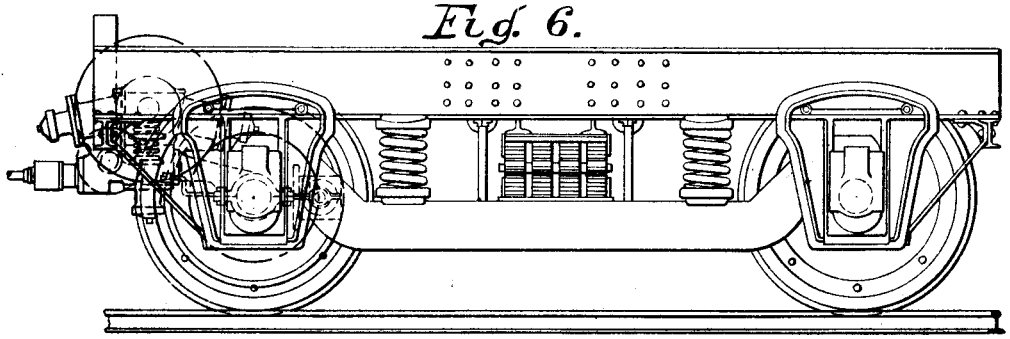
Figure 7:
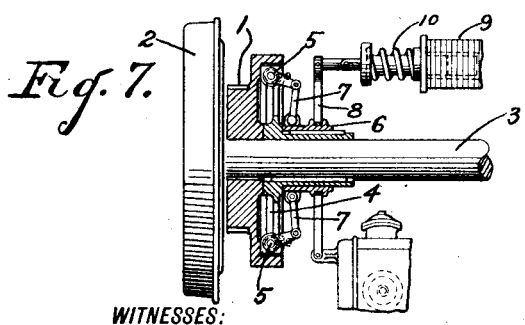
Figure 8:
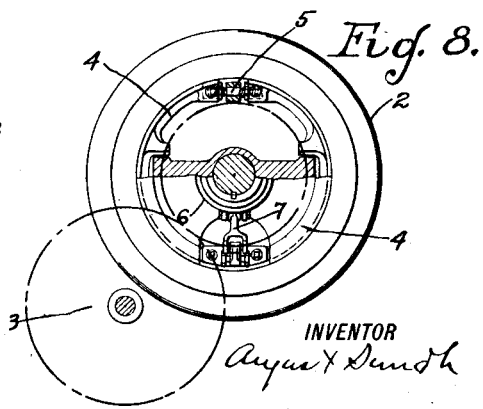
Figure 16:
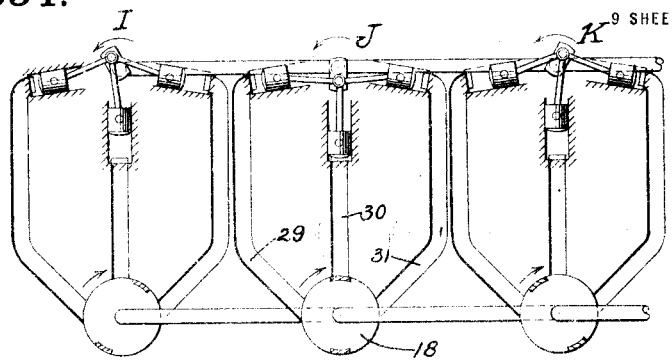
Figure 13:
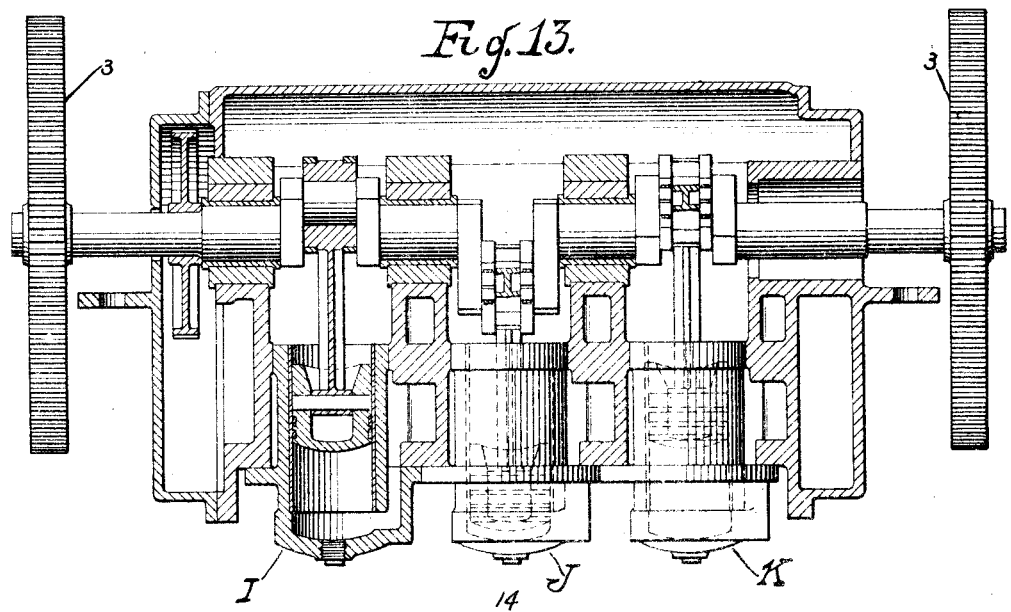
Figure 15:
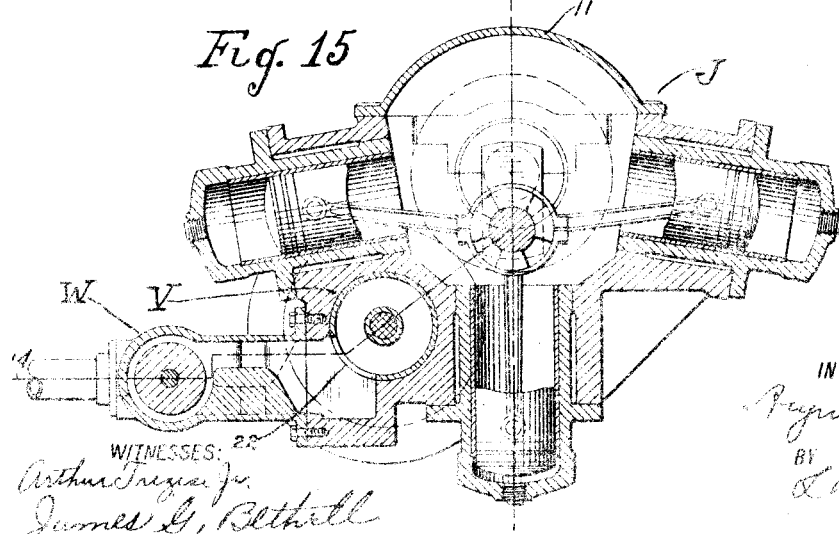
Figure 17:
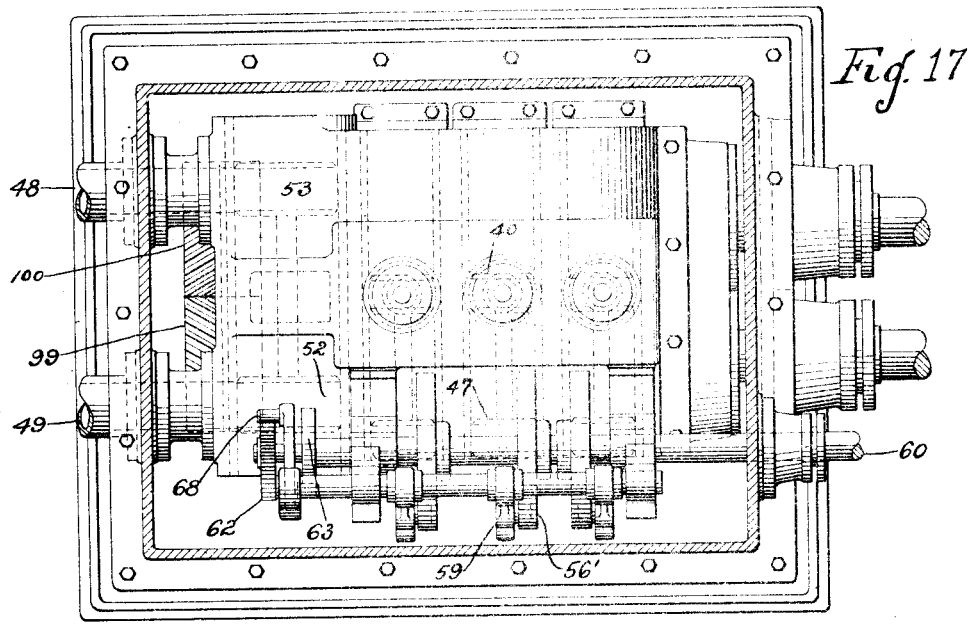
Figure 18:
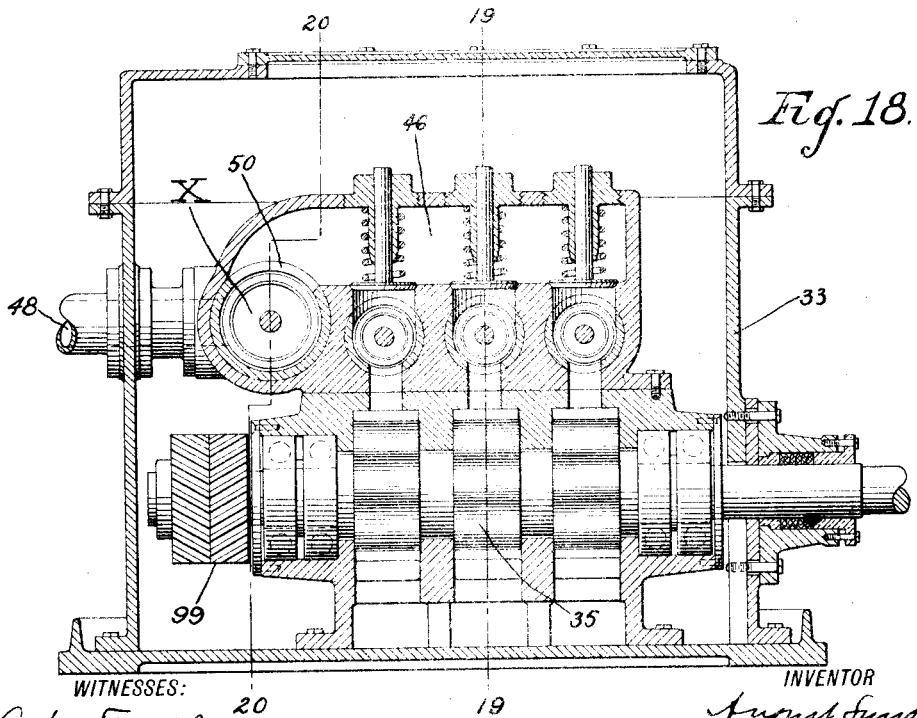

Figures 1 and 2 are elevation and plan views, respectively, of the locomotive; Figs. 3 and 4 are elevation and plan views, respectively of one of the cars; Figs. 5 and 6 are plan and elevation views, respectively, of one of the car trucks; Figs. 7 and 8 are side and end elevation views, respectively, of one of the electrically operated clutches for connecting and disconnecting the motors with their respective car axles; Fig. 9 is an elevation view of a locomotive and a connected train of two cars; Figs. 10 and 11, are diagrammatic plan views of Fig. 9, showing the electrical apparatus and controlling circuits between the locomotive and the cars; Fig. 12 is a view of one of the fluid pressure motors; Fig. 13 is a view similar to Fig. 12, showing the motor in section; Fig. 14 is a sectional view of a motor showing the arrangement of controlling and reversing valves, the section being taken substantially on the line 14, 14, of Fig. 15; Fig. 15 is a side sectional view of Fig. 14, the section being taken substantially on the line 15, 15; Fig. 16 is a diagrammatic representation showing the relative positions of the motor pistons and controlling valves; Fig. 17 is a plan view of the pump carried on the locomotive; Fig. 18 is a sectional elevation view of the pump, the section being taken substantially on the line 18, 18 of Fig. 19; Fig. 19 is an end sectional view of Fig. 18, the section being taken substantially on the line 19, 19; Fig. 20 is an end sectional view of Fig. 18, the section being taken substantially on the line 20, 20; Figs. 21 and 22 are sectional views of the valve of Fig. 20, showing the valve in different operative positions; Figs. 23, 24 and 25, show the pump controlling valves and operating means; Fig. 26 is a side sectional view of a master controller on the locomotive; Fig. 27 is an end sectional view of Fig. 26 taken on the line 27, 27.

Similar parts are designated by like reference characters in all of the figures.

Referring to Figs. 1 and 2, I show a locomotive L which carries upon it a twin internal combustion engine E, E', whose crank shafts S, S', respectively, are connected to the intermeshing gears or impellers of the gear pumps P and P'. The pumps P and P' are arranged to deliver fluid under pressure to the fluid pressure motors M and M', respectively, which in turn are connected on both sides to the wheels of the locomotive by means of suitable spur gearing cranks A and A', and B and B', respectively, each pair of cranks of one motor being arranged 90° apart so as to avoid dead centers. An auxiliary internal combustion engine F is directly connected to an electric generator or dynamo D and may also be connected to the main engine E by means of a magnetic clutch G for the purpose of starting the same. Master controllers, such as C and C, are located toward either end of the locomotive, and serve the purpose of effecting the entire control of the locomotive, as well as any desired number of connected cars.

Referring to Figs. 3 and 4, I show one of the cars, which is of standard construction, and is carried upon a pair of four wheel trucks which are shown in detail in Figs. 5 and 6. One axle of each truck carries a pair of spur gears, such as 1—1, which are loosely mounted thereon adjacent opposite wheels 2—2, and which mesh with corresponding spur gears 3, 3, secured to either end of the crank shaft 4 of a fluid pressure motor H. The driving connection between the gears 1, 1, and the axle 3 comprises internal expanding clutches (see Figs. 7 and 8) each having a pair of clutch members 4, 4, which are adapted to frictionally engage the inner periphery of the gear wheel when moved to clutching position by the reverse thread screws 5, 5, which are actuated by links 7, 7, carried upon a sliding sleeve 6 controlled by a lever 8. The lever 8 of each clutch is connected to a magnet core of a solenoid 9 which is adapted, when energized, to effect the engagement of the clutch against the action of a pair of springs 10, 10, which latter tend to release the clutch and thereby disconnect the motor H from the car wheels 2, 2, and permit the motor to remain at rest while the car may continue in motion.

The ratio of gearing between the motors and wheels of the locomotive and cars is such that the motor will operate at a lower speed than the wheels so that the piston speed will never be excessive.

The main or twin power engine E, E', as well as the auxiliary engine F need not be described, since they both may be of standard type and operate by steam, electricity, or other suitable power, but for many reasons I prefer to employ multi-cylinder internal combustion engines of high efficiency, particularly so in case of the main engine which may be of the well known "Diesel" type of internal combustion engine using a cheap fuel of low grade oil and petroleum products.

The fluid pressure motors M, M' on the locomotive, and the motors H on the cars are similar to each other in every respect, excepting that the motors M and M' are not provided with a shut off valve as are the motors on the cars, and the car motors are preferably of somewhat smaller capacity and power than those on the locomotive.

Referring to Figs. 12 to 16, inclusive, the motor therein shown is substantially like that disclosed in my Patent 980,449, issued January 3, 1911, for hydraulic engine. This motor comprises three units, I, J and K, of three cylinders each. The cylinders of each unit are arranged parallel to those of the other units and all of the cylinders are radially disposed about a common three throw crank shaft to which the single acting pistons of all of the cylinders are operatively connected, the cranks being arranged at 120° apart. The cylinders of each unit are not equally spaced about the crank shaft but have their axes at less than 90° from each other as clearly shown in Fig. 15, whereby I am enabled easily to gain access to the crank shaft and piston rod bearings by simply removing the plate 11 which serves as a cover for the crank case, and without disturbing the cylinders and other parts of the motor. Since the pistons are all single acting, each cylinder is provided with but a single port which is alternately used for pressure and discharge, and all of the ports are controlled by a rotary valve mechanism which is geared through the gears 12 and 13 to rotate at crank shaft speed. The valve mechanism comprises a casing V with a cylindrical opening to receive a bushing 14 which forms the valve chamber. Within the valve chamber is the rotary valve, which comprises a number of disks or valve sections 15, 16, 17, 18, 19, 20 and 21. The disks 16, 18 and 20 are the ones that change over the cylinder ports from pressure to exhaust and vice versa, during the operation of the motor, while the disks 15, 17, 19 and 21 are merely balancing disks for counteracting the effects of pressure on the other disks and thereby balance the valve at all times against fluid pressure. The passages 29, 30 and 31 of the motor unit J lead into ports formed in the valve lining 14 and controlled by the rotary valve disk 18. These ports are spaced apart a distance equal to the angular displacement of the cylinders of the motor unit from each other and lie in a plane perpendicular to the axis of the rotary valve. Interconnected ports 22 lie on one side of the valves 16, 18, and 20, while other interconnected ports 23 lie on the opposite sides of these same valves. As the valve is rotated, one of the valve disks, such as the disk 18, will connect the port 30, alternately to the ports 22 and 23, which latter ports are connected through the stop valve W to the pressure and exhaust pipes 27 and 28, respectively, and thus bring about a rotation of the crank shaft. The other cylinders of the unit J are alternately connected to the pressure and exhaust pipes 27 and 28 by the valve disk 18 in precisely the same manner, while the valve disks 16 and 20 perform the same functions for the motor units I and K, respectively, the valves 16, 18 and 20 being provided with lugs so as to insure a quick opening and closing of the ports at the proper moment. The diagrammatic illustration in Fig. 16 clearly shows the coöperation of the three engine units.

The shut off or stop valve W of Figs. 14 and 15 is shown in shut off position, with the valves 24 and 25 covering the ports 22 and 23 so that no fluid can enter or leave the motor cylinders. This valve is balanced by means of the valve 26 and is operated to open position by an electromagnet 31 and moved to closed position by means of a spring 32.

The pumps P and P' carried on the locomotive are similar in construction and are shown in detail in Figs. 17 to 25, inclusively. Each pump comprises a fluid tight casing 33, containing a plurality of similar gear pump units, in the present instance three, each pump unit consisting of a pair of intermeshing gears such as 34 and 35 carried upon a pair of parallel shafts 36 and 37, respectively, which are connected to, and driven by, the respective crank shafts of the twin internal combustion engine E, E', of Figs. 1 and 2. These gear pumps are in some respects similar to other pumps of this class, but I shape the intermeshing teeth so that they are substantially circular, in order to prevent locking of the fluid between the teeth as the gears rotate. One end of each shaft of the gear pump carries a herring bone phase gear such as shown at 99 and 100, and these gears closely mesh with each other to maintain the pump gears at exactly the same speed.

Gear pumps as usually constructed, have but a single driving shaft, and one pump gear drives its intermeshing gear through the pump gear teeth. That arrangement is much inferior to my arrangement of separately driven pump gears, since in the old type of pump the pump gear teeth perform the double function of driving and pumping, while with my arrangement each pump gear is separately driven and the pump gears run at the same speed due to the herringbone phase gears 99 and 100, hence no wear comes upon the pump gear teeth and their function is restricted to pumping alone. Ball bearing journals are provided for the pump shafts so as to reduce the wear and increase the efficiency of the pump.

The pump casing 33 is fluid tight and is adapted to be filled, or very nearly so, with some light oil which is unaffected by temperature. As the pump gears, such as 34 and 35, rotate, fluid is driven from the casing through the passage 38 and delivered to a chamber 39 above the pump gears. From here it enters the valve chamber 41 on either side of the valve 40 and is returned to the casing through the right hand open end of the valve chamber and through a series of ports such as 42 located at the other or left hand end of the valve chamber. Under these conditions the pump gears perform no useful work and merely circulate the fluid in the casing. Above the valve 40 is a check valve 44 which is normally held to its seat by a spring 45 and which when raised, opens into a chamber 46, which is common to all of the units of one of the pumps. If the valves 40 and 47 be moved to the right so as to prevent any fluid from passing out of either end of the valve chamber 41, the pressure set up in the fluid by the pump gears forces open the check valve 44 and enters the compression chamber 46, and is conducted through the port 50 to the reversing valve X to one of the pipes 48 or 49, and from there is led to the fluid pressure motors M, M' and H on the locomotive and cars, respectively. The compression chamber 46 is connected through the port 50 to the center of the reversing valve chamber 51, in which latter are arranged a pair of piston valves 52 and 53, which cover ports 54 and 55, respectively, when the reversing valve is in neutral position as shown in Fig. 20. When the reversing valve as shown in Fig. 20 is moved to the left, it assumes the position shown in Fig. 21, with the port 50 in communication with the port 54 and the port 55 in communication with the fluid contained in the pump casing 33. The port 54 is connected to the pipe 49, while the port 55 is connected to the pipe 48, hence it will be seen that with the gear pump running continuously in one direction the pipe 49 may be made a pressure pipe and the pipe 48 an exhaust pipe and vice versa, depending on the position of the reversing valve corresponding to Fig. 21 and Fig. 22, respectively.

The gear pumps are arranged to be controlled so that they may be successively put to work, so that the quantity of fluid pumped to the fluid pressure motors may be varied and controlled at will without varying the speed of the pump gears. This I effect in the following manner: Each gear pump unit is controlled by a valve, such as 40, which has already been described, and is operable to cause the corresponding pump unit either to idle and merely circulate the fluid in the pump casing without producing a working pressure, or to cause the pump unit to force the fluid through the check valve 44 and into the compression chamber 46 under pressure, from whence it is led to the working cylinders of the various fluid pressure motors carried on the locomotive and cars. I propose so to control the pump units that one unit of each of the pumps P and P' is first put to work compressing and delivering fluid under pressure to the motors, the other pump units merely idling. The next operation is to move the controlling valves of another set of pump units so that they commence to deliver fluid under pressure and assist the units already at work, in other words, substantially I double the flow of fluid to the motors. The next operation causes the two remaining pump units to add their output to the total output of the other pump units, so that three times the fluid is now supplied to the motors as was formerly supplied when but a single pump unit of each pump was working against a pressure.

The mechanism for controlling the valves of the various pump units to effect the foregoing result is clearly shown in Figs. 1, 2, 17, and Figs. 23 to 27, inclusive. This mechanism comprises a shaft 60 which extends lengthwise of the locomotive and is provided at either end with a hand wheel 61 which is intended to be manipulated by the engineer or train operator. Secured to the shaft 60 are a plurality of face plate cams, 56, 56', and 56'', each formed with a cam slot 57, 57' and 57'' which contains a roller 58, 58' and 58'' secured to a lever 59, 59' and 59'' connected to operate the valves 40, 40' and 40'', respectively. As will be seen from Figs. 23, 24, and 25, the cam slots are of different shape and so formed with respect to each other that limited rotary movement of the shaft 60 in either direction moves first the valve 40' into position to cause the corresponding pump unit to pump into the compression chamber. A further rotation of the shaft 60 moves the valve 40 in like manner to set the corresponding pump unit to work, while a still further rotation of the shaft 60 moves the valve 40'' so that its corresponding pump unit begins to supply fluid under pressure to the motors. The cam slots 57', 57 and 57'', are so formed, as an inspection of Figs. 23, 24 and 25 will show, that the valve 40' will move to closed position before the valve 40 is moved at all, while the valve 40 will be moved to closed position before the valve 40'' will be moved. The pump units of the pumps P and P' are exactly alike, as also are their controlling valves, and the different pump units of one pump are controlled like the corresponding units of the other pump and simultaneously therewith.

The reversing valves X of each pump are similar in construction and both are controlled from the shaft 60 by means of cams, a set of cams such as 62 and 63 (see Figs. 20, 21, and 22) being used for each valve. The cams 62 and 63 are alike in form but are arranged differently upon the shaft 60 and secured against movement thereon. The cam 62 co-acts with a roller or pin 63 carried upon one limb 66 of a bell crank lever 64, while the cam 73 co-acts with a roller or pin 67 carried upon another limb 65 of the bell crank lever 64, the limb 66 being connected through a link 69 to the reversing valve stem. When the reversing valve occupies a neutral or intermediate position as shown in Fig. 20 and the shaft 60 is rotated in an anti-clockwise direction, the cam 62 pushes the pin 68 to the left and thereby moves the crank arm 66 and valve to the left into the position shown in Fig. 21, in which position of the valve the pump compression chamber is connected through the ports 50 and 54 to the motors, while the exhaust from the motors is returned through the port 55 and out of the right hand open end of the valve chamber 51 to the interior of the pump casing. If the shaft 60 be moved in a clockwise direction from center position, the cam 63 pushes the pin 67 and crank arm 65 to the right, thereby moving the valves 52 and 53 to the position shown in Fig. 22, wherein the direction of flow of fluid from the pump is reversed or sent to the motors from the port 55 which formerly was an exhaust port.

It will be observed that a line drawn through the pins 67 and 68 will substantially pass through the center of the shaft 60, so that there is no appreciable tendency for the fluid to effect a rotation of the controller shaft 60 through the cams, and, since the reversing valve is balanced against fluid pressure, it requires practically no power to move the same into any one of its positions. Furthermore, it will be observed that it requires but a small rotary movement of the shaft 60 to effect an opening of the ports 54 and 55, whereas it requires a further rotation of the shaft 60 to move the valves 40' of the pump units into pumping position, so that there can never be the possibility of any of the pump units being put to work while the reversing valve is in an intermediate or closed position.

The master controllers C and C' are similar and are illustrated in detail in Figs. 1

26 and 27. Each controller comprises a casing 60 through which passes the shaft 60 having the hand wheels 61 secured thereto. Surrounding the shaft 60 in the casing, and rotatably movable thereon, is a sleeve 71 to one end of which is fastened a hand operated lever 72 extending through a slot 73 in the casing. To the other end of this sleeve is secured an insulated contact member comprising two segmental contacts 74 and 75. The contact 74 is in continuous electrical engagement with a contact ring 76, while the contact segment 74 is adapted successively to engage a series of fixed contacts 77 to 82, inclusively, as the lever is moved in an anti-clockwise direction from neutral or center position. Conductors are secured to the contact ring 76 and contacts 77 to 82, inclusive, and are led out from the controller through a conduit 83. The controllers C and C' are similar and their respective contacts are wired in parallel so as to control the train from either one at will.

The control and operation of a train comprising a locomotive and two cars may best be seen from Figs. 9, 10 and 11. Assuming all parts are at rest, and the electric switches 87, 88, 89 and 90 are closed, the first operation is to start the auxiliary engine F on the locomotive. As soon as this engine has run up to speed, the dynamo D is generating its full normal potential and the switch 84 may now be closed. Upon closing this switch 84 a circuit is established to the magnet winding of the clutch G and the auxiliary engine rotates the main twin engines E and E'. The latter immediately take up their cycle and run under their own power, and the switch 84 may now be opened, thereby disconnecting the clutch G and permitting the auxiliary engine to operate the dynamo D alone as its normal load. As soon as the main engines start, the pumps P and P' commence to circulate the fluid in the pump casings. The operator or engineer now moves the lever 72 of controller C to the left as far as it will go, or until the contact segment 74 bridges all of the contacts 77 to 82, inclusive. A circuit may now be traced from the brush 85 of the dynamo through the conductor 86 to a terminal of all of the clutches 9, 9, on the locomotive and the shut off valves W, W, on each car. The return circuit of the clutch and stop valve magnets of the forward motor of the first car is via the controller contact 77, contact ring 76, and to the dynamo brush 91. The motor is now mechanically coupled to the wheels of the forward truck of the first car and the stop valve W on this motor is moved by the magnet 31 so as to connect the motor H through the train pipes 92 and 93 to the pumps. In like manner the contact 78 of the master controller establishes a circuit which effects the operation of the clutch and stop valve of the motor on the second truck of the first car. The contact 79 does the same for the forward motor of the second car, and the contact 80 likewise for the rear motor of the second car. Under the present conditions of operation, the motors H are all connected in parallel through the train pipes 92 and 93 to the pressure and exhaust sides, respectively, of both of the pumps, and each motor is operatively connected through its corresponding clutch with a car axle. The engineer or operator now takes hold of the hand wheel 61 of the master controller and slightly rotates it in one direction or the other depending upon which direction he wishes the train to move. Let us assume that he desires to go ahead. The first movement of the hand wheel sets the reversing valve in the proper position for directing fluid to all of the motors in parallel in a direction to cause a forward movement of the train, but since the pumps are still running idle or merely by passing the fluid in the pump casings, no fluid pressure is directed to the motors and the train remains at rest. The operator next gives the hand wheel a further rotary movement so as to effect the closing of one of the controlling valves, such as 40' of Fig. 23, of each of the pumps P and P'. One unit of each pump now supplies fluid under pressure to every motor on the train, and, since the working area of the motors is at a maximum while the amount of fluid pumped is at a minimum, the train slowly and gradually gets under way. Since the total driving force transmitted through the pumps is distributed throughout all of the motors, and to a plurality of driving or traction wheels, the traction of the train as a whole is substantially at a maximum, which fact enables the train quickly to accelerate when so desired without danger of the wheels slipping, which is always present on steam railroads where the locomotive alone supplies all of the traction and driving power. The next operation is when the operator moves the hand wheel farther to put to work another pump unit of each pump, which obviously doubles the output of the pumps and effects an increase in the speed of the motors and train. A further movement of the hand wheel throws into service the third set of pump units and the pump output is now at a maximum and the train is moving at a fair rate of speed, all of the motors on both the locomotive and cars being active. In order further to increase the speed of the train, the operator next moves the lever 72 of the master controller backward, or until the contact 80 is open circuited. The circuit is broken at this contact to the clutch magnet 9 and stop or shut off valve W of the rear motor on the last car, and this motor is disconnected from the wheels, and its shut off valve is simultaneously closed, so that the fluid from the pump can no longer pass to this particular motor, and it comes to rest, the corresponding car axle being free to rotate. Since this motor is now cut out of use, the working area of the fluid is reduced and more fluid is available to the remaining motors, and consequently the speed of the train is increased. As the switch lever 72 is gradually brought back to center, the contacts 79, 78 and 77 are successively open circuited, attended by the cutting out of all of the car motors one at a time accompanied by a corresponding increase in train speed, until finally all of the car motors are at rest and the entire output of both pumps P and P' is directed to the motors M and M' on the locomotive and the train runs at its highest speed.

In order to reduce the speed of the train and finally bring it to rest, the switch lever 72 is moved gradually over the contacts 77 to 82, inclusively, thereby successively cutting in the car motors one by one until all are active. As each motor is cut in, the working area of the fluid is increased and the speed of the train is gradually reduced. To effect a further reduction in train speed, the pump units are successively by-passed or thrown out of circulation with respect to the motors, so that the quantity of fluid supplied to the latter is correspondingly reduced, attended by a corresponding reduction in train speed. When the hand wheel is finally moved to stop position, the pump units no longer supply fluid to the train pipe and motors, and the reversing valve is closed, which of course means that the fluid in the motors is locked and likewise the wheels of the cars and locomotive become locked and the train comes to rest.

Under certain conditions I may moderate the brake action of the train due to the fluid locking in the motors by means of spring loaded check valves which will permit the motors to relieve themselves of excessive pressure, and, by regulating the adjustment of these valves so that they will open only upon a predetermined pressure, I can accurately determine a suitable braking power, which should never be more than just enough to permit the wheels to roll without blocking them.

The train pipes 92 and 93 extend throughout the entire length of the train and are supplied with shut off valves such as 94, 95 and 96, so that the locomotive may be used alone or with any desired number of cars. Either motor cars or trailers may be coupled up in a train together with a locomotive, and the locomotive may be coupled up to the cars at either end or between the cars, as desired. For instance, in the arrangement shown in Fig. 11, the valves 95 will be closed, and the valves 94 on the last car also closed, and the remaining valves open. Other valves such as 98, 98, on the first car, may be closed so as to cut out the corresponding motors H on that car, in which case the switches 87 and 88 should be opened so as to prevent these motors from being clutched to the car wheels when the train is operated.

It will be observed that the contacts 81 and 82 of the master switch are not used for a train of two cars, but these contacts are arranged to effect the control of a third car if it were desired to add a third car to the train shown in Figs. 9, 10 and 11. If more cars were to be added, additional contacts similar to the contacts 81 and 82 will be provided on the master switch, hence it is readily seen that a train may be made up of any desired number of cars, I having shown but two merely for purposes of illustration.

It will be further observed that when starting the train from a position of rest, all of the fluid pressure motors on the train are active and but a single unit of each pump is delivering fluid under pressure to the said motors. This means that the maximum torque and traction is produced at the minimum speed of the train, and the torque varies inversely as the speed, which obviously is a most efficient and practical method of controlling and operating a train system.

The method of operation of the train by the master controller, as above described, may be varied if so desired, since it is possible to vary the sequence of operation of the pump units and the fluid pressure motors by manipulating the hand wheel and switch lever other than above described and by using a greater number of pump units a greater refinement in operation may be obtained.

I wish not to be limited to the exact construction disclosed as various changes in details of construction and arrangement of parts might be made by those skilled in the art without departing from the spirit and scope of the invention.

What I claim and desire to secure by Letters Patent of the United States is:

1. A train comprising a locomotive and connected car, a prime mover on the locomotive, a pump connected to run with said prime mover, a fluid pressure motor arranged to drive the car, and means for directing fluid under pressure from said pump to said car motor.

2. A train comprising a locomotive and connected car, a prime mover on the locomotive, a pump connected to run with said prime mover, fluid pressure motors having driving connections with the wheels of said locomotive and car, and means for conveying fluid under pressure between the said pump and fluid pressure motors.

3. A train comprising a locomotive and connected car, a prime mover on the locomotive, a pump connected to run with said prime mover, fluid pressure motors having driving connections with the wheels of said locomotive and car, means for conveying fluid under pressure between the said pump and motors, and means for controlling said fluid.

4. A train comprising a locomotive and connected car, a prime mover on the locomotive, a pump connected to run with said prime mover, fluid pressure motors having driving connections with the wheels of said locomotive and car, means for conveying fluid under pressure between the said pump and motors, valves in said fluid conveying means, and means for controlling said valves.

5. A train comprising a locomotive and connected car, fluid pressure motors connected to drive the wheels of said locomotive and car, a pump on the locomotive, a prime mover for operating the pump, means for conveying fluid between said pump and motors, and electro-magnetic means for controlling said fluid conveying means.

6. A train comprising a locomotive and a plurality of connected cars, fluid pressure motors connected to drive said cars, a prime mover on the locomotive, a pump operated by said prime mover, means for conveying fluid between said pump and motors, electro-magnetic means for controlling said fluid conveying means, and manually controlled means for controlling said electro-magnetic controlling means.

7. A train comprising a locomotive and a plurality of connected cars, a prime mover on the locomotive, a pump operated by said prime mover, fluid pressure motors carried on the cars, fluid conveying means between the said pump and motors, and means for effecting a driving connection between any motor and its corresponding car.

8. A train comprising a locomotive and a plurality of connected cars, a prime mover on the locomotive, a pump operated by said prime mover, fluid pressure motors carried on the cars, fluid conveying means between the said pump and motors, and means for operatively connecting and disconnecting any desired motor with its respective car.

9. A train comprising a locomotive and a plurality of connected cars, a prime mover on the locomotive, a pump operated by said prime mover, fluid pressure motors carried on the cars, fluid conveying means between the said pump and motors, and electro-magnetic means for effecting a driving connection between any motor and its respective car.

10. A train comprising a locomotive and a plurality of connected cars, a prime mover on the locomotive, a pump operated by said prime mover, fluid pressure motors carried on the cars, fluid conveying means between the said pump and motors, and electro-magnetic means for operatively connecting and disconnecting any desired motor with its respective car.

11. A train comprising a locomotive and a plurality of connected cars, a source of fluid pressure on the locomotive, fluid pressure motors on the cars, means for conveying fluid between said pressure source and all of the motors to effect a slow speed of the train with maximum traction, and means successively to disconnect all but a single motor from said source of pressure supply to effect a maximum train speed with minimum traction.

12. A train comprising a locomotive and a plurality of connected cars, a source of liquid pressure on the locomotive, liquid pressure motors on the cars, means for directing fluid between said source of liquid pressure and said motors, and means for controlling all of said motors from a single point.

13. A train comprising a locomotive and a plurality of connected cars, a source of fluid pressure on the locomotive, fluid pressure motors on the cars, means for directing fluid between said source of fluid pressure and said motors, and electro-magnetic means for controlling all of said motors from a single point.

14. A train comprising a locomotive and connected cars, means carried on the locomotive for generating a fluid pressure, fluid pressure motors on the car, means for transmitting fluid pressure from the locomotive to the motors on the cars, and means for effecting a driving connection between said motors and their respective cars.

15. A train comprising a locomotive and connected cars, means carried on the locomotive for generating a fluid pressure, fluid pressure motors on the car, means for transmitting fluid pressure from the locomotive to the motors on the cars, and electro-magnetic means controlled from a single point for effecting a driving connection between said motors and their respective cars.

16. A train comprising a locomotive and connected cars, means carried on the locomotive for generating a fluid pressure, fluid pressure motors on the car, means for transmitting fluid pressure from the locomotive to the motors on the cars, and electro-magnetic clutches associated with each motor and arranged to effect a driving connection with the corresponding car, and means for controlling all of said clutches from a common point.

17. A train comprising a locomotive and connected cars, a source of fluid pressure on the locomotive, fluid pressure motors on the cars connected to be operated by fluid from said source, and means for controlling the supply of fluid to the motors so as to vary the speed of the train inversely as the driving torque.

18. A train comprising a plurality of connected cars, a fluid pressure motor on each car arranged to drive the same, a constantly operated pump on one of the cars, fluid connections between each motor and the pump, and means to vary the said connections to effect the control of the train.

19. A train comprising a plurality of connected cars, a fluid pressure motor on each car arranged to drive the same, a constantly operated pump on one of the cars, fluid connections between each motor and the pump, and means to vary the said connections to effect a variation in the speed and driving torque of the train.

20. A train comprising a plurality of connected cars, a fluid pressure motor on each car, arranged to drive the same, a constantly operated pump on one of the cars, fluid connections between each motor and the pump and means successively to cut off one motor after another from the pump to increase the speed of the train until the motor of a single car is operated from the pump at maximum speed.

21. A train comprising a locomotive and connected cars, fluid pressure motors connected to drive the wheels of said locomotive and cars, a power driven pump on the locomotive, fluid connections between said pump and motors, and means for effecting the control of the train by varying the said fluid connections and the output of the pump.

22. A train comprising a locomotive and connected cars, fluid pressure motors connected to drive the wheels of said locomotive and cars, a power driven pump on the locomotive, fluid connections between said pump and motors, and means for effecting the control of the train first by varying the said fluid connections between the pump and motors and then controlling the pump.

23. A train comprising a locomotive and connected cars, fluid pressure motors connected to drive the wheels of said locomotive and cars, a power driven pump on the locomotive, fluid connections between said pump and motors, and means for effecting the control of the train first by varying the said fluid connections between the pump and motors, and then varying the amount of fluid delivered by the pump.

24. A train comprising a locomotive and connected cars, fluid pressure motors connected to drive the wheels of the locomotive and cars, a power driven pump on the locomotive, and means for directing fluid from the pump to all of the motors to start the train and to cut off the supply of fluid to the car motors to accelerate the train and to cut in the supply of fluid to the car motors to reduce the speed of the train.

25. A train comprising a locomotive and connected cars, a fluid pressure motor carried by each car, a clutch associated with each motor arranged to form a driving connection between the car wheels and the motors, a fluid motor connected to drive the locomotive, a power driven pump on the locomotive, fluid conveying means between the pump and motors arranged to connect all of the motors in parallel relation with each other, a valve associated with the motor of each car, and means for independently controlling the valve and clutch of each motor to effect the control of the train.

26. A train comprising a locomotive and connected cars, a fluid pressure motor carried by each car, a clutch associated with each motor arranged to form a driving connection between the car wheels and the motors, a fluid motor connected to drive the locomotive, a power driven pump on the locomotive, fluid conveying means between the pump and motors arranged to connect all of the motors in parallel relation with each other, a valve associated with the motor of each car, and means to effect the operation of the valve and clutch of each motor successively so as to vary the number of motors driving the train and thereby vary the speed of the train and the driving traction in inverse ratio.

27. A train comprising a locomotive and connected cars, a fluid pressure motor on each car normally out of driving engagement with the car wheels, a power driven pump on the locomotive, and means adapted simultaneously to direct fluid from the pump to a motor, and to establish a driving connection between a motor and the wheels of the corresponding car to effect the control of the speed and driving traction of the train.

28. A train comprising a locomotive and connected cars, a fluid pressure motor on each car normally out of driving engagement with the car wheels, a power driven pump on the locomotive, and electro-responsive means adapted simultaneously to direct fluid from the pump to the motor, and to establish a driving connection between a motor and the wheel of the corresponding car to effect the control of the speed and driving traction of the train.

29. A train comprising a locomotive and connected cars, a fluid pressure motor on each car normally out of driving engagement with the car wheels, a power driven pump on the locomotive, and electro-responsive means controlled from a single point on the train adapted to direct fluid from the pump to a motor, and to establish a driving connection between a motor and the wheels of the corresponding car to effect the control of the train.

30. A train comprising a locomotive and connected cars, an internal combustion engine on the locomotive, a pump connected to said engine, fluid pressure motors connected simultaneously to drive the locomotive and cars, means for directing fluid under pressure from the pump to all of the motors, means for varying the output of the pump from zero to a maximum to effect the operation of the motors to start the train, and means for cutting off the flow of fluid to the motors in sequence and simultaneously to disconnect the motors from driving engagement with the wheels of the corresponding cars to effect an increase in train speed.

31. A train comprising a locomotive and connected cars, an internal combustion engine on the locomotive, a pump connected to said engine, fluid pressure motors connected simultaneously to drive the locomotive and cars, means for varying the output of the pump from zero to a maximum to effect the operation of the motors to start the train and electrically controlled means for cutting off the flow of fluid to the motors in sequence and simultaneously to disconnect the motors from driving engagement with the wheels of the corresponding cars to effect an increase in train speed.

32. A train comprising a locomotive and connected cars, an internal combustion engine on the locomotive, a pump connected to said engine, fluid pressure motors connected simultaneously to drive the locomotive and cars, means for directing fluid under pressure from the pump to all of the motors, means for varying the output of the pump from zero to a maximum to effect the operation of the motors to start the train, and electrical means controlled from a single point for cutting off the flow of fluid to the motors in sequence and simultaneously to disconnect the motors from driving engagement with the wheels of the corresponding cars to effect an increase in train speed.

33. A train comprising a locomotive and connected car, a fluid pressure motor on both the said locomotive and car adapted to drive the same, an internal combustion engine on the locomotive, a pump driven from said engine, an additional engine, a clutch connecting both of said engines, electro-magnetic means for operating said clutch to permit the said additional engine to start the internal combustion engine, a dynamo driven from said additional engine for supplying current to said electro-magnetic clutch operating means, means for conveying fluid under pressure from said pump to said motors, an electrically operated valve controlling the flow of fluid to the motor on the car, and means on the locomotive for directing current from said dynamo to said valve to effect the operation of the said car motor to vary the speed and traction of the train.

34. In a self propelled vehicle, the combination of road wheels, a fluid pressure motor, reciprocating mechanism connecting said motor and wheels, a power driven pump comprising a plurality of pump units, and means for establishing a fluid connection between said motor and each of said pump units successively to effect a variable speed of the vehicle.

35. In a self propelled vehicle, the combination of road wheels, a fluid pressure motor, reciprocating mechanism connecting said motor and wheels, a power driven pump comprising a plurality of pump units, and means for establishing a fluid connection between said motor and each of said pump units in succession, and to reverse the direction of flow of fluid to effect a variable speed of the vehicle in either direction of travel.

36. In a self propelled vehicle, the combination of road wheels, a fluid pressure motor, reciprocating mechanism connecting said motor and wheels, a power driven pump comprising a plurality of pump units, and valve mechanism for establishing a fluid connection between said motor and each of the said pump units in succession to effect a variable speed of the vehicle.

37. In a self propelled vehicle, the combination of road wheels, a fluid pressure motor, a reciprocating driving connection between said motor and wheels, a prime mover, a pump driven thereby at constant speed and comprising a plurality of pump units, a valve controlling the fluid delivery of each pump unit, fluid connections between said motor and pump, means for operating said valves to control the amount of fluid delivered to the motor and thereby vary the speed of the vehicle, and a valve adapted to reverse the direction of fluid flow between the pump and motor to effect the reverse of the said vehicles.

38. In a locomotive, the combination of driving wheels, a frame work carried by said wheels, a power plant supported on the frame work and comprising a double explosive engine connected to a pump at either end, a hydraulic engine connected to each of said pumps, said hydraulic engines being connected with the driving wheels, and means to run the explosive engine and either one of the hydraulic engines separate or together.

39. In a train system, the combination of a locomotive carrying an independent power plant, a plurality of cars equipped with hydraulic engines, and connections between said locomotive and the plurality of cars for circulating a fluid to and from a desired number of engines on the cars and the power plant on the locomotive.

40. In a train system, the combination of a locomotive, a power plant carried thereon adapted to generate a supply of fluid pressure, fluid engines on the cars operated at will from said fluid supply, and an independent power plant on the locomotive for generating power for the control of the first named power plant and the engines on the cars.

41. In a locomotive, the combination of a prime mover, a hydraulic variable speed device actuated by said prime mover and comprising a pressure pump and a fluid engine, and driving connections comprising connecting rods between the engine and the wheels of the locomotive.

42. In a locomotive, the combination of a prime mover, a hydraulic variable speed device actuated by said prime mover and comprising a pressure pump and a fluid engine, and driving connections between the engine and the wheels of the locomotive comprising speed reduction gearing whereby the engine may operate at a lower speed than the wheels of the locomotive.

43. In a locomotive, the combination of driving wheels, a prime mover on the locomotive, a hydraulic variable speed gear driven by said prime mover, and intermediate mechanism connecting said gear with the driving wheels arranged to increase the speed between the hydraulic variable speed gear and the driving wheels.

44. In a locomotive, the combination of driving wheels, a frame work carried by the said wheels, a prime mover carried by the frame work, a hydraulic transmission gear comprising a pump and engine placed on said frame work in an elevated position above the driving wheels, and connecting means between the engine and all of the wheels.

45. In a locomotive, the combination of coupled driving wheels, a frame work supported thereby, a prime mover on the frame work, a hydraulic power transmitting device driven by the prime mover, and placed on the framework in an elevated position above the driving wheels, and connecting rods between said device and the driving wheels.

46. In a locomotive, the combination of a prime mover in the form of an internal combustion engine, a second internal combustion engine adapted to start the prime mover, a clutch between said engines, a hydraulic variable speed gear driven from said prime mover and operatively connected to the driving wheels of the locomotive, and manual means to control said variable speed gear and said clutch.

47. In a train system, the combination of a locomotive, a prime mover on the locomotive, a hydraulic transmission device driven by said prime mover and comprising a pump and a fluid pressure engine connected to drive the locomotive, hydraulic engines on any desired number of cars in the train, means for conveying fluid from the locomotive to the engines on the cars, and means to control said fluid at will.

48. In a train system, the combination of a locomotive, a hydraulic engine connected to drive the locomotive wheels, a power driven pump on the locomotive connected to said engine, hydraulic engines on the cars, means for connecting and disconnecting said car engines with the car wheels, means to conduct fluid from the pump to all of said hydraulic engines, and electrical means for controlling the fluid to the engines on the cars.

49. In a train system, a plurality of cars, engines on a desired number of said cars, liquid pressure means for operating said engines, means for generating a liquid pressure on one of the cars, and means to conduct and control said liquid pressure to the engines on the cars.

50. In a train system, a plurality of cars, engines on a desired number of said cars, liquid pressure means for operating said engines, means for generating a liquid pressure on one of the cars, means to conduct said liquid pressure to the engines on the cars, and means to control said liquid from one of the cars.

51. In a train system, a plurality of cars, engines on a desired number of said cars, fluid pressure means for operating said engines, means for generating a fluid pressure on one of the cars, means to conduct said fluid pressure to the engines on the cars, means to control said fluid from one of the cars, and means independent of the fluid for controlling said engines.

52. In a train system, a plurality of cars, engines on a desired number of cars, fluid pressure means for operating said engines, means for generating a fluid pressure on one of the cars, means for conducting the fluid to the engines, and manually controlled electrical means for controlling the fluid supply to the engines.

53. In a train system, a plurality of cars, engines on a desired number of cars, mechanism on one of the cars for generating a fluid pressure supply for the engines, and means for generating an electric current for controlling the engines.

54. In a train system, a plurality of cars, engines on a desired number of cars, mechanism on one of the cars for generating a fluid pressure supply for the engines, means for generating an electric current, means for directing the fluid under pressure to the engines, and a manually controlled circuit closer for controlling said electric current to control the engines.

55. In a train system, the combination of a plurality of connected cars, engines on a desired number of cars for driving the same, means for generating a fluid pressure on one of the cars, means for conveying said fluid to the engines, electromagnetic valve apparatus for controlling the supply of fluid to the engines, a source of electric current generated on one of the cars, and a manually operated switch for directing said electric current to the control of the said valve apparatus.

56. In a train system, the combination of a plurality of connected cars, hydraulic engines on said cars, means on one of the cars for generating a supply of fluid under pressure and an electric current, electromagnetic means for controlling the supply of fluid to said engines, and means for directing the electric current to said electro-magnetic controlling means from a desired point on the train.

57. In a train system, a plurality of cars, hydraulic engines on a desired number of cars, means to control said engines by electric current generated on one of the cars, and means to drive said engines by a fluid conducted to said engines and generated at a desired point on the train.

58. In a train system, the combination of a car, an engine on the car, a locomotive connected thereto, said locomotive comprising driving wheels, axles connecting the wheels, a frame work carried on the axles, a power plant on the frame work, said power plant comprising an explosive engine and hydraulic transmission devices for transmitting the power from the engine to the driving wheels, and to the engine on the car.

59. The combination of a car truck, a hydraulic motor carried on the truck and geared to the truck wheels, fluid means for operating the motor, means to control said fluid means, and means to connect and disconnect the motor from the wheels.

60. The combination of a car truck, a hydraulic motor carried on the truck and geared to the truck wheels, fluid means for operating the motor, electric means to control said fluid means, and electro-magnetic means for connecting and disconnecting said motor from the wheels.

61. In a railroad car, the combination of trucks to carry the car body, wheels and axles on said trucks, a hydraulic motor yieldingly connected to the trucks and geared mechanically with the axles through a clutch mechanism, and means simultaneously to control said motor and clutch mechanism.

In testimony whereof, I have signed my name to this specification in the presence of two subscribing witnesses.

AUGUST SUNDH.

Witnesses:
WALTER C. STRANG,
ERNEST L. GALE, Jr.